April 15, 1924.   W. H. GERSTENSLAGER   1,490,895
TIRE OPENING MACHINE
Filed June 13, 1919   4 Sheets-Sheet 1
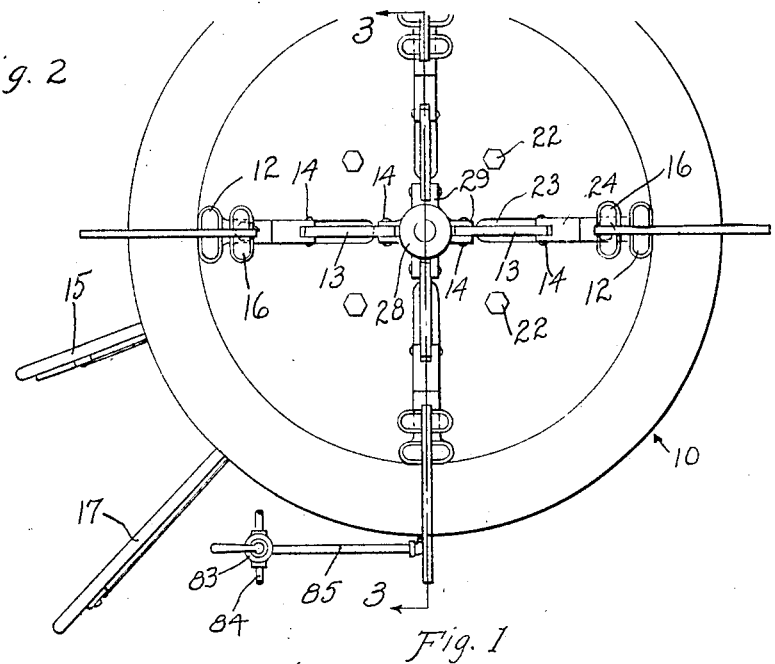
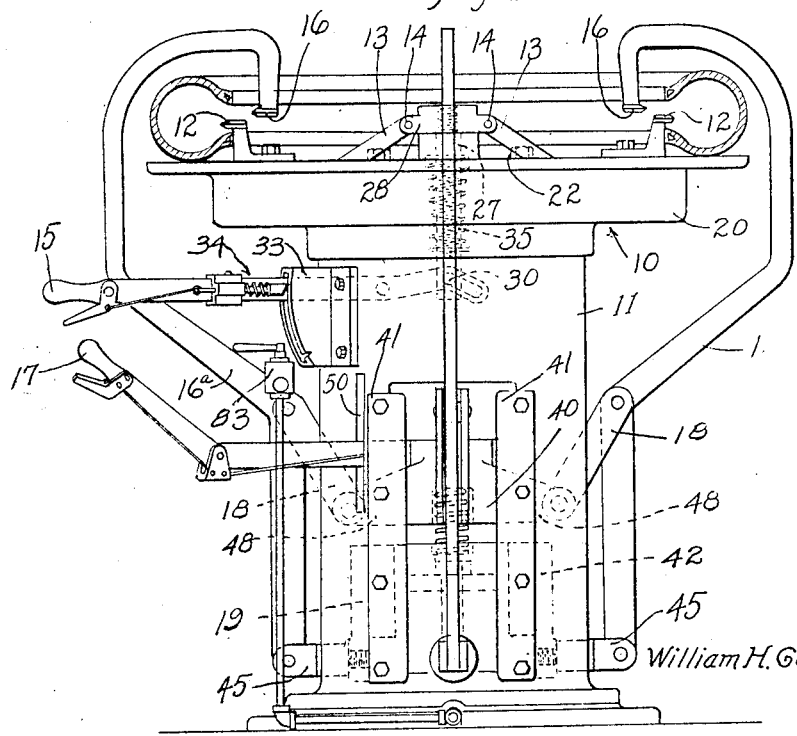
Inventor
William H. Gerstenslager
By C. S. Landon
Attorney April 15, 1924.
W. H. GERSTENSLAGER
TIRE OPENING MACHINE
Filed June 13, 1919
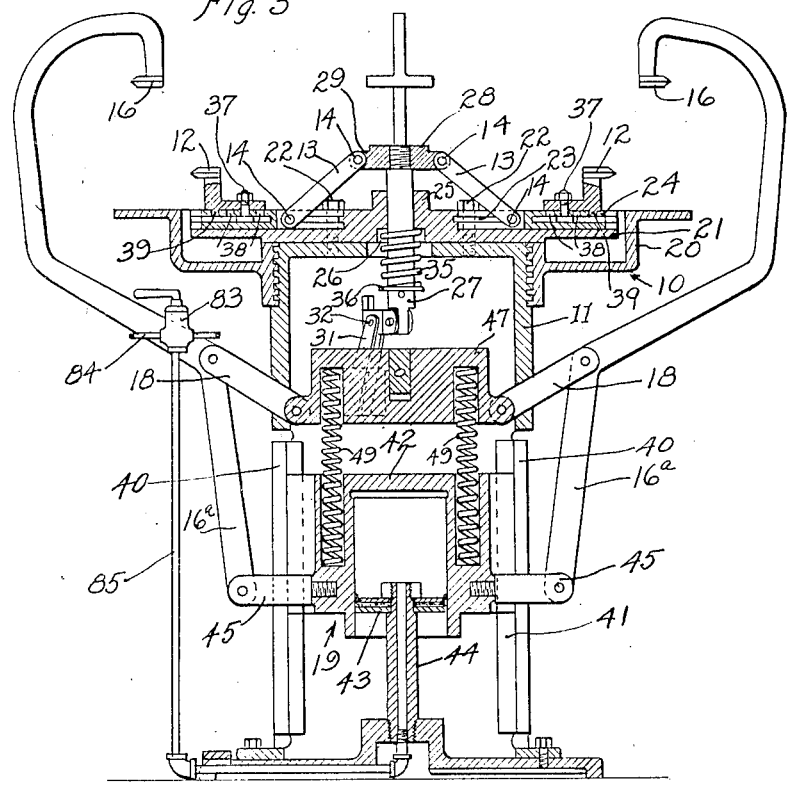
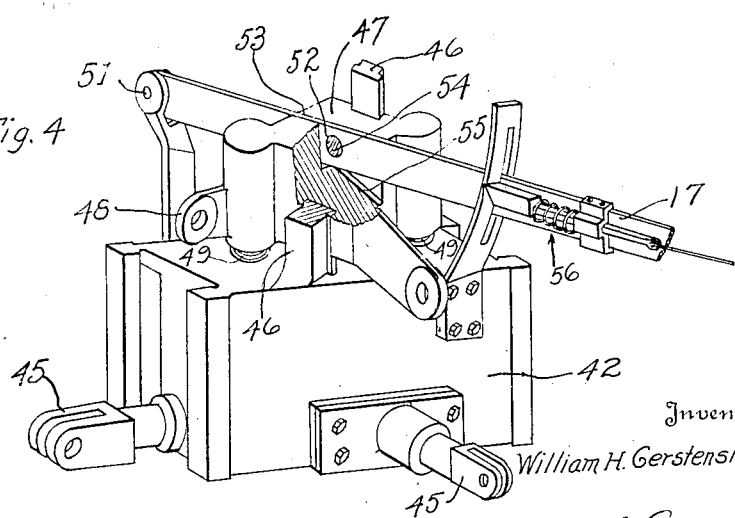
Inventor
William H. Gerstenslager
By C. S. Landon.
Attorney

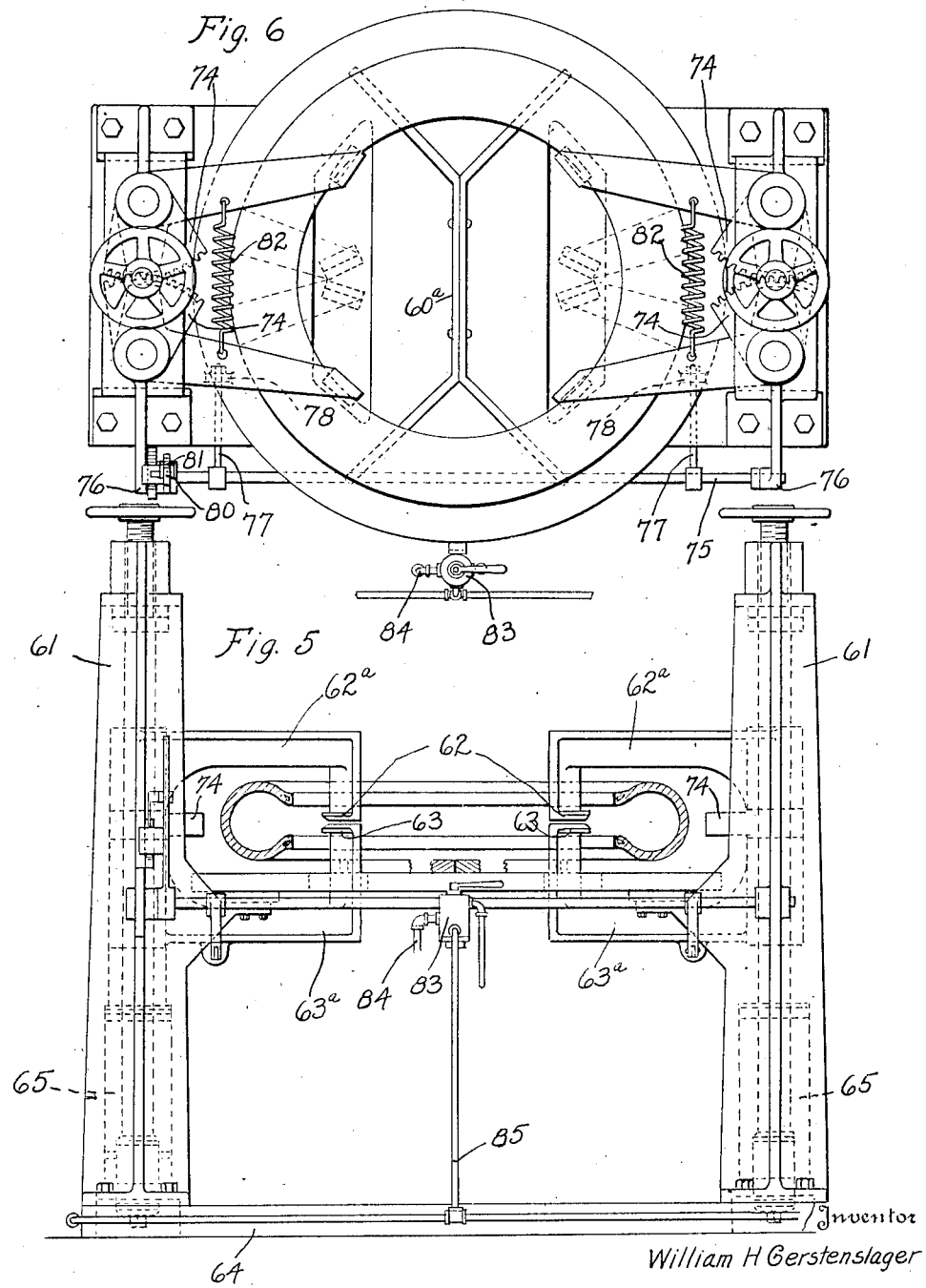

April 15, 1924.
W. H. GERSTENSLAGER
1,490,895
TIRE OPENING MACHINE
Filed June 13, 1919
4 Sheets-Sheet 4
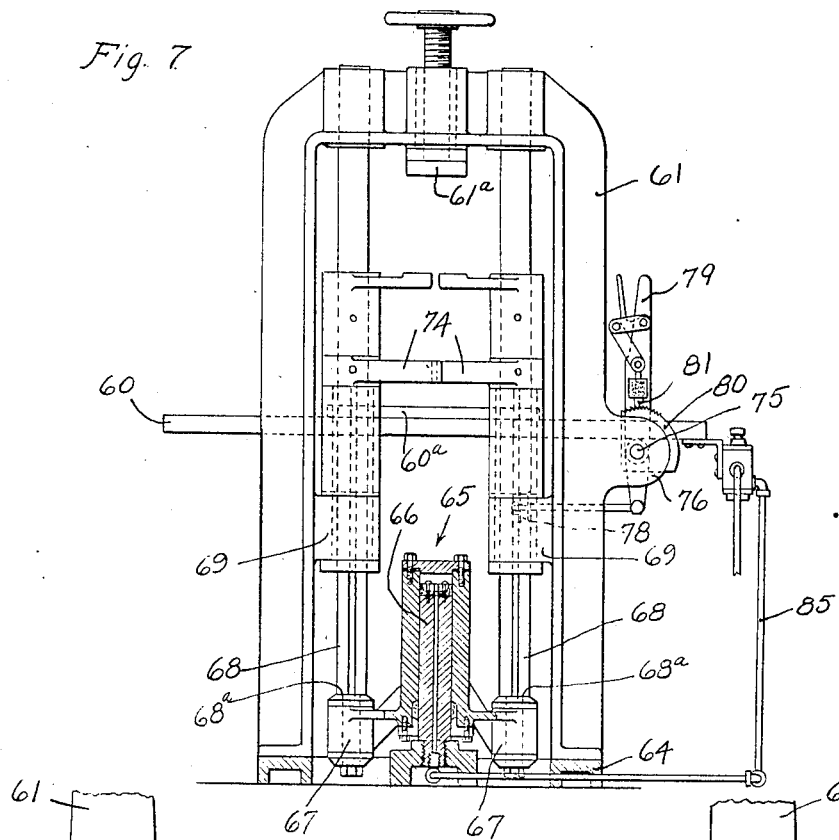
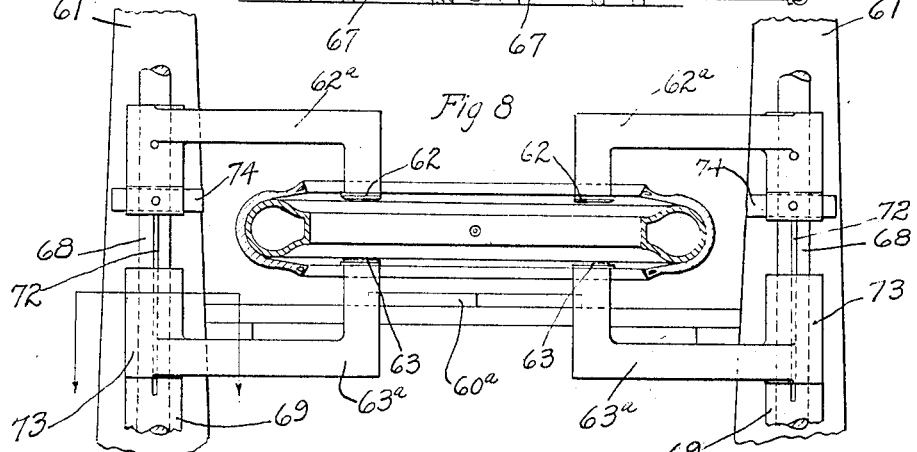
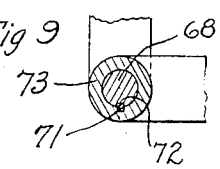
Inventor
William H. Gerstenslager
By C. S. Landon,
Attorney Patented Apr. 15, 1924.

1,490,895

UNITED STATES PATENT OFFICE.

WILLIAM H. GERSTENSLAGER, OF AKRON, OHIO, ASSIGNOR TO THE GOODYEAR TIRE & RUBBER COMPANY, OF AKRON, OHIO, A CORPORATION OF OHIO.

TIRE-OPENING MACHINE.

Application filed June 13, 1919. Serial No. 304,000.

*To all whom it may concern:*

Be it known that I, WILLIAM H. GERSTENSLAGER, a citizen of the United States, and resident of Akron, Ohio, have invented new and useful Improvements in Tire-Opening Machines, of which the following is a specification.

The present invention relates to new and useful improvements in apparatus for opening tire casings in the course of their manufacture.

In the manufacture of pneumatic tires, it is frequently necessary for several purposes to spread and temporarily hold apart the edges or beads of the tire casing. For example, the sides of the tire casing are pulled apart to permit inspection of the interior of the tire. Again, it is customary in the manufacture of pneumatic tires under the so-called two-cure method, to give the completely built tire its final vulcanization while fitted on an air bag. These air bags are relatively stiff owing to the fact that they are made up of several heavily frictioned plies of fabric, and often alternate layers of asbestos materials. Also, the tires cured under this method have several strands of piano-wire incorporated in the beads which renders them almost inextensible by hand. The insertion of these stiff air bags in the tires between the unyielding beads has heretofore been done manually, which has proven very fatiguing to the operator.

Finally, in assembling the inner tube and casing, prior to putting the finished tire on the market, it is again necessary to open the casing and hold it open while the inner tube is being inserted.

Being cognizant of the foregoing conditions I have, therefore, in mind, as one of the principal objects of my present invention, the provision of an apparatus which may be conveniently used by the operator to separate the edges of the casing and hold them separated for inspection of the interior of the casing, or for the insertion of the air bag or the inner tube into the opened tire.

Another object is to produce a mechanical structure that will engage more than one portion of the beads thereby relieving all undue strains upon the beads as would be experienced where only one portion was spread or engaged at a time.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated preferred embodiments of the invention and throughout the several views of which, similar reference numbers designate corresponding parts:

Figure 1 is a front elevation of my improved device;

Figure 2 is a plan view of same;

Figure 3 is a vertical section on the line 3—3 of Fig. 2;

Figure 4 is a detailed perspective of the ram head;

Figure 5 is a front elevation of a modified structure;

Figure 6 is a plan view of same;

Figure 7 is a side elevation partly in section;

Figure 8 is a detailed view of the tire engaging arms shown in the position assumed when the tire is fully spread; and Figure 9 is a detail section on the line 9—9 of Fig. 8.

In the present embodiment of my invention, and particularly that illustrated in Figs. 1-4 inclusive, the apparatus includes essentially a circular horizontal work supporting table 10, supported by a central hollow standard 11; a plurality of relatively stationary bead engaging members or fingers 12; mechanism such as a series of links 13, pivots 14 and a handle 15 whereby the positions of the members 12 may be controlled; a plurality of movable bead engaging members or fingers 16; and means, such as a handle 17, links 18, and a ram 19 whereby the members may be correctly positioned with respect to the tire beads and then separated by the action of the fluid pressure on a ram piston.

The table 10 may be of any desired construction, but preferably is of the form shown in Figs. 1, 2 and 3 which comprises a cylindrical flange portion 20 screw threaded upon the upper extremity of the standard 11 and a circular plate member 21 arranged to be seated within the flange portion 20 and to be secured as by bolts 22 to the top of the standard 11.

This plate member 21 is provided with four longitudinally cut grooved slots 23 in which are mounted for sliding engagement therewith slides 24, upon which are adjustably mounted the relatively stationary bead engaging members 12. The plate 21 is also equipped with a central boss 25 which is drilled and counter-sunk as at 26 for an operating shaft 27. A cross head 28 mounted upon the upper end of the shaft 27 carries a plurality of projecting lugs 29 (in this embodiment four pairs are illustrated) to which are pivotally connected links 13 which in turn are pivotally connected to the inner ends of the slides 24.

The lower end of the shaft 27 projects downward into the hollow supporting standard 11 and carries a pin 30 to which is flexibly connected one end of the operating arm or handle 15. The other end of the handle projects laterally through a slot cut in the standard and terminates in a suitable handle or hand hold. A bracket 31 bolted or otherwise secured to the inner surface of the standard 11, adjacent the slot cut therein for the handle 15, provides a bearing for the handle, both members 15 and 31 being drilled and engaged by a pivot pin 32.

To permit the operator to readily adjust the handle 15 to different positions, a segment 33, bolted to the standard 11, and a latch mechanism 34 carried by the handle proper are provided, see Fig. 1.

To relieve the engaged bead portions of the tire of all undue strain etc., and to produce a more flexible mechanism, I provide a coiled expansion spring 35 upon the shaft 27, one end of which seats in the recessed portion 26 of the plate 21, the other end bearing against a washer 36 secured to the shaft adjacent the pivot pin 30.

In order to keep my apparatus as compact as possible and at the same time insure its adaptability to all sizes of tires I provide each of the slides 24 with a central bore, which is in turn grooved laterally to accommodate the head portion of a T-shaped bolt 37, and a plurality of notches 38 upon the upper surface. The bead engaging members 12 in turn carry upon their lower surfaces a lug 39 which registers with one of the notches 38 in a selective manner and is held in such engagement by means of nuts carried upon the upper ends of the T-shaped bolts 37, as will be understood.

The lower portion of the standard 11 is slotted at diametrically opposite portions as at 40 and to the edges of these openings are secured plates or flanges 41 which form guides for a sliding cylinder 42. The cylinder 42 forms one of the component parts of a ram mechanism 19, the other being a stationary piston 43 carried on a hollow piston rod or shaft 44 screwed into or otherwise securely fastened to the base of the standard 11, in such a manner that when fluid pressure is applied (in a manner later to be described) to the hollow shaft 44, the piston remains stationary while the cylinder is caused to move vertically, as will be apparent.

The cylinder 42 has cast therewith or otherwise secured thereto a series of bearing lugs 45 to which are pivotally connected the lower ends of the arms 16ª carrying the movable bead engaging members or fingers 16. The cylinder 42 also carries upon its upper surface a pair of upstanding guide members 46 which are adapted to slidably support a cross head 47, see Fig. 4, wherein one of guide members 46 is broken away. This cross head 47 in turn carries a pair of oppositely disposed bearing lugs 48 to which the arms 16ª of the bead engaging members 16 are connected by the links 18. The bearing lugs 48 of the cross head 47 are drilled for the reception of a pair of springs 49 which are also seated in recesses in the cylinder 42.

The operating handle or arm 17 for the control of the movable arms 16ª of the bead engaging members 16, is likewise projected through an aperture 50 provided in the standard 11, but in this case the pivot 51 is beyond the connection 52 to the parts to be effected, so that a downward movement of the arm 17 will in turn impart a downward movement of the parts, as will be understood.

The connection between the arm 17 and the cross head 47 is accomplished as follows—the cross head is slotted upon its upper surface as at 53 in which slot the arm 17 is arranged to be mounted upon a pivot pin 54 carried in the head. The slot 53 is so cut as to provide a pair of oppositely angled surfaces 55 for a purpose later to be described.

As in the case of the arm 15, the arm 17 is also provided with a latch mechanism designated as 56 in the drawings whereby the arm may be conveniently set as desired.

In the construction illustrated as a modification in Figs. 5-9 inclusive, the tire is similarly laid upon a horizontal table 60, supported, in this instance, by a pair of end standards 61. Upon the table 60 is placed a spacer or supporting frame 60ª, which may be of different thicknesses to accommodate different sized tires. As before, the tire is to be engaged by pairs of upper and lower bead engaging members 62 and 63 respectively, only here the paired members are both mounted upon common supports, as will presently appear.

The standards 61 are of an inverted —U— shape, secured at their ends to a bed plate 64. Mounted upon the bed plate and centrally disposed between the legs of the —U— is a ram mechanism 65, the piston or shaft 66 of which is hollow and screw threaded or otherwise secured to the bed plate 64, thus permitting the cylinder portion to move vertically as is desired. The cylinder has projecting from its lower portion a pair of bearing bosses 67, which afford mountings for a pair of vertically disposed shafts 68 having shoulders 68ª, the shoulders permitting rotation of the shafts 68 in the bosses 67. These shafts 68 extend upward through bearings 69 mounted upon the sides of the —U— standards, through bosses carried upon the outer ends of the arms 62ª and 63ª of the bead engaging members 62 and 63 respectively and then upward through bearings cast in the —U— standards. As shown in Fig. 8, the lower pairs of arms 63ª of the bead engaging members 63 are each mounted on one of the shafts 68 by means of a rib or key 71 on the sleeve 73 of the arm 63ª, which rib is adapted to slide in a groove 72 in the shaft 68, thus permitting the shafts 68 to reciprocate vertically through the sleeve 73, but insuring the rotation of sleeve 73 and the arms 63ª with the rotation of the shafts 68, as will be understood.

The arms 62ª of the upper bead engaging members 62, are, on the other hand, fixedly secured to the respective shafts 68, as by pins or set screws, so that they will reciprocate vertically as well as rotate with the shafts 68.

Mounted upon the shafts 68 between the upper and lower members 62 and 63 are pairs of segmental gears 74 which are fixedly secured thereto, in a manner whereby they are in mesh with each other and any rotary movement of one shaft will cause the opposite shaft to be rotated in the opposite direction. Thus, it will be seen that when a rotary motion is given to the shafts the bead engaging members 62 and 63 will be thrown outward into engagement with the beads, as seen in Fig. 6. This movement is effected by means of a shaft 75 mounted in bearings 76 upon the standard 61, a pair of cranks 77 carried by the shaft, links connecting the free ends of the cranks with lugs 78 carried by the lower inside arms 63ª and a handle or operating arm 79 conveniently mounted upon the shaft, for rocking the same. To permit the operator to retain the arms 63ª in any desired position, a segment 80 and a latching mechanism 81 are provided, see Fig. 7. Springs 82 are provided for returning the lower arms 63ª to the innermost positions.

Adjustable stops 61ª are mounted in the cross pieces of the U shaped standards 61 to limit the upward movement of the bosses of the upper arms 62ª, thereby permitting the use of tire casings of different sizes, and to prevent the beads being pulled too far apart.

In each of the embodiments of my invention illustrated in the drawings, the fluid supply to the ram mechanism is controlled by a single valve 83. This valve is conveniently mounted adjacent the operating arms 15, 17 and 79 respectively and is interposed in a main supply line 84. From the valve 83 a pipe 85 connects with the ram 19 in one case and is branched in the other to connect with the rams 65, see Figs. 3 and 5. One position of the valve 83 permits the fluid to circulate to the rams while another position exhausts the pressure in the rams as will be apparent.

*Operation.*

Assuming the apparatus to be in a neutral or inoperative position, see Fig. 3, the operator will place a tire upon the table 10, and then push down on the handle 15, thereby causing the relatively stationary bead engaging member 12 to engage the lower bead, as in Fig. 1. The valve 83 is then operated to allow the ram cylinder 42 to drop to its lowest position. The operator will then push down on the handle 17 thereby causing the upper bead engaging members 16 to engage the upper bead. This rocking movement of the arm 17 is permitted by reason of the oppositely angled surfaces 55. The valve 83 will then be operated again, this time to admit fluid pressure and lift the ram cylinder 42 with its associated parts, thus lifting the upper bead engaging members 16, to spread the edges or beads of the tire carcass sufficiently for the purposes above referred to, for example the inserting of the air bag, and to hold them spread as long as may be desired. The valve 83 is finally operated to exhaust the ram and permit the cylinder to drop. The bead engaging members are brought back to their original position by manipulation of handles 15 and 17.

The operation of the modified form of apparatus shown in Figs. 5 to 9 is analogous, except that the bead engaging members 62 and 63 are swung laterally to engage and disengage the beads, by operation of the handle 79 and the gears 74. The upper bead engaging members 62 are lifted by the shafts 68 which carry them, the latter being in turn carried upward by the ram 65.

While I have shown different specific forms of apparatus, it will be evident that changes and modifications may be made in the apparatus which fall within the scope of the claims hereto appended, without in any way departing from the essence of my invention.

What I claim is:

1. An apparatus of the character described, comprising elements adapted to enter between the edges of a tire casing, means for adjusting certain of said elements and means to separate said elements.

2. An apparatus of the character described, comprising elements adapted to enter between the edges of a tire casing, means for adjusting certain of said elements and power operated means to separate said elements.

3. An apparatus of the character described, comprising a set of upper arms, a set of lower arms, a finger on one end of each arm and means for moving one set of arms relatively to the other whereby the fingers are separated.

4. An apparatus of the character described, comprising a set of upper arms, a set of lower arms, a finger on one end of each arm and fluid operated means for moving one set of arms relatively to the other whereby the fingers are separated.

5. An apparatus of the character described, comprising a set of upper arms and a set of lower arms substantially oppositely disposed thereto, a finger on each of said arms, reciprocating shafts, one of said sets being mounted on said shafts to rotate therewith, the other of said sets being fixedly secured to said shafts to both rotate and reciprocate therewith, means for rotating said shafts, and means for reciprocating said shafts to separate the fingers of said sets of arms.

6. In a machine for the purpose set forth, the combination of a series of arms arranged in a circle, fingers on the ends of said arms projecting outwardly of said circle, a second series of arms, fingers on the ends of said second arms normally located adjacent said first named fingers, and means for moving one of said series of arms to separate the fingers.

7. In a machine for the purpose set forth, the combination of a series of arms arranged in a circle, fingers on the ends of said arms projecting outwardly of said circle, a second series of arms, pivotal mountings for said second named arms, angular portions at the ends of said second named arms, fingers on the ends of said angular portions adjacent to and extending in the same direction as said first named fingers, and means for moving one of the sets of arms to separate the fingers.

8. An apparatus of the character described comprising a plurality of oppositely disposed elements adapted to engage the inner edges of a tire casing, and means for separating the elements to open the tire throughout its entire circumference.

In witness whereof, I have hereunto signed my name in the presence of two subscribing witnesses.

WILLIAM H. GERSTENSLAGER.

Witnesses:
C. A. STRAW, Jr.,
E. C. LEADENHAM.